(12) United States Patent
Lee et al.

(10) Patent No.: US 11,480,552 B2
(45) Date of Patent: Oct. 25, 2022

(54) METHOD FOR MEASURING CONTENT OF MOISTURE IN SECONDARY BATTERY SEPARATOR

(71) Applicant: LG Chem, Ltd., Seoul (KR)

(72) Inventors: Min-Jeong Lee, Daejeon (KR); Jong-Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 767 days.

(21) Appl. No.: 16/343,261

(22) PCT Filed: Jan. 3, 2018

(86) PCT No.: PCT/KR2018/000079
§ 371 (c)(1),
(2) Date: Apr. 18, 2019

(87) PCT Pub. No.: WO2018/135777
PCT Pub. Date: Jul. 26, 2018

(65) Prior Publication Data
US 2019/0250132 A1 Aug. 15, 2019

(30) Foreign Application Priority Data
Jan. 20, 2017 (KR) ................ 10-2017-0009794

(51) Int. Cl.
*G01N 30/66* (2006.01)
*G01N 1/40* (2006.01)
(Continued)

(52) U.S. Cl.
CPC ............ *G01N 30/66* (2013.01); *B32B 27/32* (2013.01); *G01N 1/2226* (2013.01);
(Continued)

(58) Field of Classification Search
CPC ...... G01N 1/2226; G01N 1/4055; G01N 1/38; G01N 2001/2229; G01N 2001/2893;
(Continued)

(56) References Cited

U.S. PATENT DOCUMENTS 5,631,100 A 5/1997 Yoshino et al.
6,335,202 B1 1/2002 Lee et al.
(Continued)

FOREIGN PATENT DOCUMENTS

CN 1327547 C 7/2007
CN 103339757 A 10/2013
(Continued)

OTHER PUBLICATIONS

Translation of JP2020-053324 (Year: 2020).*
(Continued)

*Primary Examiner* — Natalie Huls
(74) *Attorney, Agent, or Firm* — Lerner, David, Littenberg, Krumholz & Mentlik, LLP

(57) ABSTRACT

The present invention provides a method for measuring moisture content in a separator of secondary battery by using a gas chromatograph equipped with a headspace sampler. The separator of secondary battery may be a safety reinforced separator (SRS) in which inorganic substance particles and a binder polymer are coated on a polyolefin substrate.

9 Claims, 2 Drawing Sheets

(51) Int. Cl.

| | | |
|---|---|---|
| *G01N 1/22* | (2006.01) | |
| *H01M 10/42* | (2006.01) | |
| *H01M 10/48* | (2006.01) | |
| *G01N 30/02* | (2006.01) | |
| *B32B 27/32* | (2006.01) | |
| *H01M 50/40* | (2021.01) | |
| *H01M 50/409* | (2021.01) | |
| *H01M 50/411* | (2021.01) | |
| *H01M 50/446* | (2021.01) | |
| *H01M 50/449* | (2021.01) | |

(52) U.S. Cl.
CPC ...... *G01N 1/4055* (2013.01); *H01M 10/4285* (2013.01); *H01M 10/48* (2013.01); *H01M 50/40* (2021.01); *H01M 50/409* (2021.01); *H01M 50/411* (2021.01); *H01M 50/446* (2021.01); *H01M 50/449* (2021.01); *G01N 2001/2229* (2013.01); *G01N 2030/025* (2013.01)

(58) Field of Classification Search
CPC ....... G01N 2001/025; G01N 2030/045; G01N 30/04; G01N 30/66
See application file for complete search history.

(56) References Cited

U.S. PATENT DOCUMENTS

| | | | |
|---|---|---|---|
| 2004/0171161 A1* | 9/2004 | Miller | G01N 31/168 436/42 |
| 2005/0118509 A1 | 6/2005 | Inagaki et al. | |
| 2012/0276119 A1 | 11/2012 | Deckert et al. | |
| 2013/0280584 A1 | 10/2013 | Matsumura | |
| 2015/0233874 A1 | 8/2015 | Aono | |
| 2016/0322618 A1* | 11/2016 | Jeong et al. | H01M 10/4235 |
| 2018/0136177 A1* | 5/2018 | Fukatsu et al. | H01M 4/139 |

FOREIGN PATENT DOCUMENTS

| | | | | |
|---|---|---|---|---|
| CN | 205449907 | U | 8/2016 | |
| CN | 106153769 | A | 11/2016 | |
| EP | 01746673 | A1 | 1/2007 | |
| JP | S57147869 | A | 9/1982 | |
| JP | H0954073 | A | 2/1997 | |
| JP | H1062400 | A | 3/1998 | |
| JP | 2000214053 | A | 8/2000 | |
| JP | 2001013124 | A | 1/2001 | |
| JP | 2006145254 | A | 6/2006 | |
| JP | 2006220897 | A | 8/2006 | |
| JP | 2012018095 | A | 1/2012 | |
| JP | 2014226894 | A | 12/2014 | |
| JP | 5930049 | B2 | 6/2016 | |
| JP | 2016114456 | A | 6/2016 | |
| JP | 2020-053324 | * | 2/2020 | ............. H01M 2/16 |
| KR | 970004141 | B1 | 3/1997 | |
| KR | 20000001465 | A | 1/2000 | |
| KR | 20150001963 | A | 1/2015 | |
| KR | 20150064438 | A | 6/2015 | |
| WO | 2012073996 | A1 | 6/2012 | |

OTHER PUBLICATIONS

"Development of a reliable method to determine water content by headspace gas chromatography/mass spectrometry with the standard addition technique", Analytical Methods, v. 7, 4816-4820 (Year: 2015).*
Xie and Chai, "Rapid Determination of Moisture Content in Paper Materials by Multiple Headspace Extraction Gas Chromatography", Journal of Chromatography A, vol. 1443, Apr. 2016, pp. 62-65.
International Search Report for PCT/KR2018/000079, dated Apr. 24, 2018.
Korean Search Report for KR10-2017-0009794 dated Nov. 1, 12017.
Korean Search Report for KR10-2017-0009794 dated Oct. 21, 2016.
Japanese Search Report for Application No. 2019516211 dated Jan. 19, 2020, 6 pages.
Chinese Search Report for Application No. 201880004017.0 dated Jul. 6, 2021, 3 pages.

* cited by examiner

[Fig. 1]
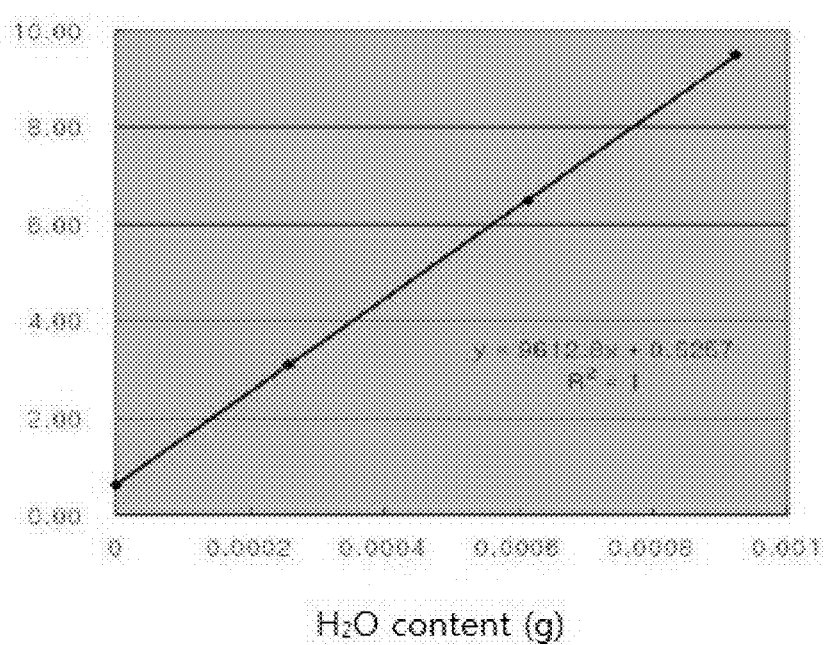
[Fig. 2]
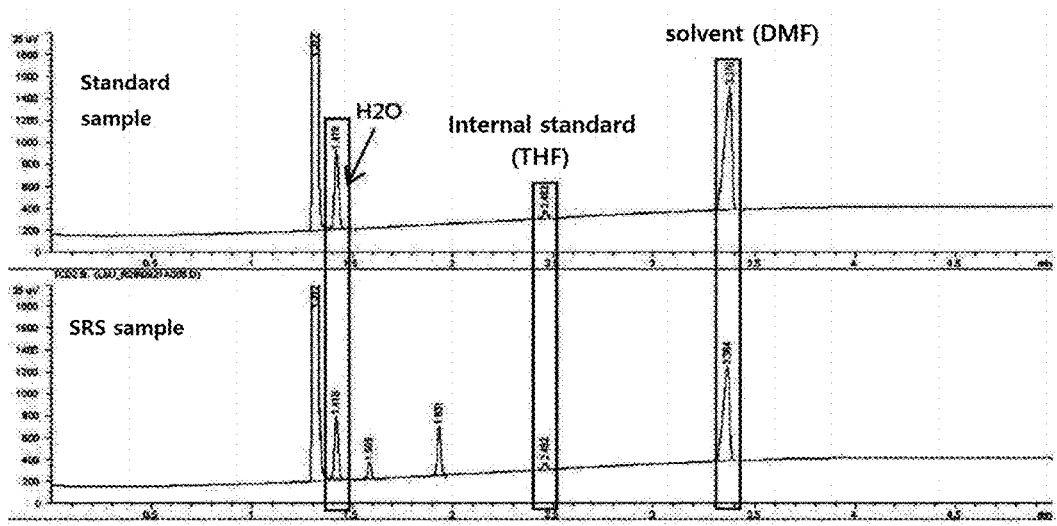

[Fig. 3]
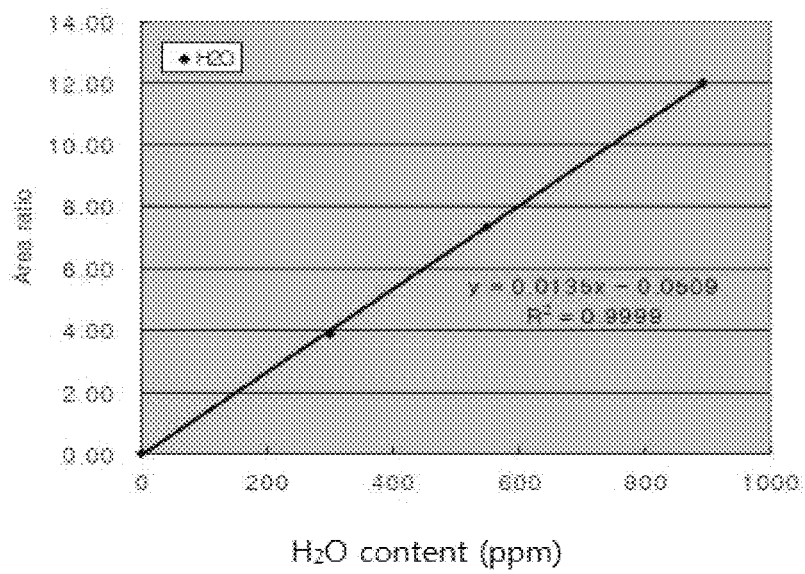
[Fig. 4]
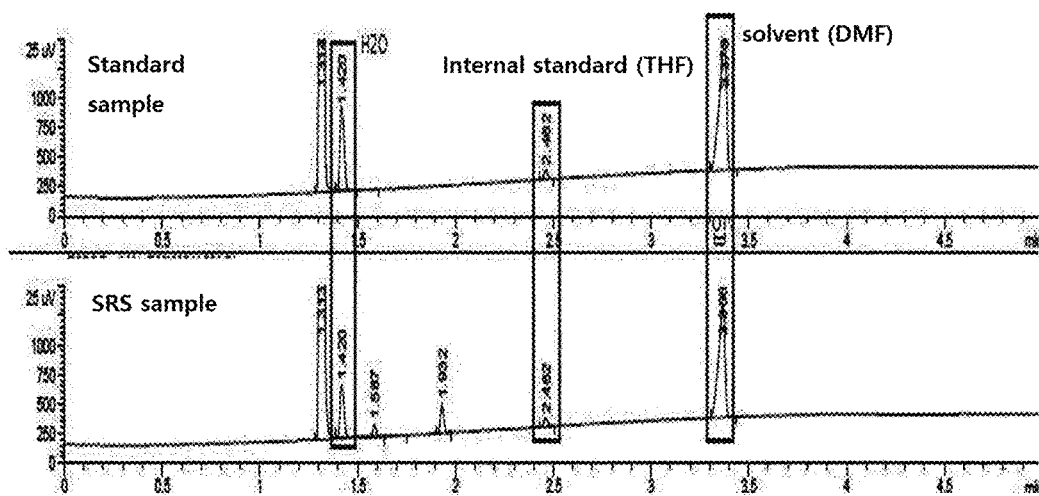

METHOD FOR MEASURING CONTENT OF MOISTURE IN SECONDARY BATTERY SEPARATOR

CROSS-REFERENCE TO RELATED APPLICATIONS

The present application is a national phase entry under 35 U.S.C. § 371 of International Application No. PCT/KR2018/000079 filed Jan. 3, 2018, which claims priority from Korean Patent Application No. 10-2017-0009794 filed Jan. 20, 2017, the disclosures of which are hereby incorporated by reference.

The present invention relates to a method for measuring a moisture content in a separator of a secondary battery, and more particularly to a method for measuring a moisture content in a separator of a secondary battery by using a gas chromatograph equipped with a headspace sampler.

BACKGROUND ART

During the operation of a lithium ion battery, gas components such as hydrogen, oxygen, nitrogen, carbon monoxide, carbon dioxide, methane, ethane, ethylene, and propane are generated from the battery. Information on composition and content of the generated gas, which is a technology for evaluating the thermal and structural degradation of the battery, can be used as a key evaluation index for development of the battery. Therefore, such information is useful for development of battery materials, optimization of processes of manufacturing the battery, and identification of causes of battery failure.

Recently, the use of portable electronic devices has been increasing as electronic equipment becomes smaller and lighter. The need of a battery having a high energy density as a power source for such portable electronic devices has been increased, and research on the secondary battery has actively progressed.

The secondary battery comprises an electrode assembly composed of an anode, a cathode, and a separator for separating the anode and the cathode. The moisture present in the separator of the secondary battery is known to affect the volume expansion and lifetime reduction of the battery by generating hydrogen, etc., inside the battery. Therefore, it is important to accurately measure moisture present in the separator of the secondary battery.

With regard to the measurement of moisture, the most commonly used method in the art is Karl-Fisher titration method. The Karl-Fisher titration method is the method which measures and the moisture content in a sample from the consumed amount of a Karl-Fischer reagent reacting with water in a chemical equivalent manner by extracting water from the sample with anhydrous methanol and then by titrating with a Karl-Fischer reagent having a known titer.

However, it has been confirmed that in the case of using the Karl-Fisher titration method the measured value of the moisture content in the separator of the secondary battery is not accurate. Accordingly, there is a need for a method that can more accurately measure the moisture content in the separator of the secondary battery.

DISCLOSURE

Technical Problem

An object of the present invention is to provide a method for measuring a moisture content in a separator of a secondary battery that can more accurately measure a moisture content compared with conventional measurement methods by using a gas chromatograph equipped with a headspace sampler.

Technical Solution

According to the first aspect of the present invention, there is provided a method for measuring a moisture content in a separator of a secondary battery by using a gas chromatograph equipped with a headspace sampler.

According to one embodiment of the present invention, the separator is a safety reinforced separator (SRS) in which an inorganic substance particles and a binder polymer are coated on a polyolefin substrate.

According to one embodiment of the present invention, the polyolefin is polyethylene or polypropylene.

According to one embodiment of the present invention, the inorganic substance particle comprises $Al_2O_3$, $BaTiO_3$, $BaSO_4$, $TiO_2$ or a combination thereof.

According to one embodiment of the present invention, the binder polymer is a polymeric materials such as polyvinylidene fluoride (PVDF).

According to one embodiment of the present invention, the method comprises the steps of: (a) mixing an internal standard with a solvent to prepare an internal standard solution; (b) mixing the solvent with water and then introducing the internal standard solution hereto to prepare a standard sample; (c) mixing the solvent with a sample of the separator of the secondary battery and then introducing the internal standard solution hereto to prepare a test sample; and (d) measuring a moisture content in the standard sample and a moisture content in the test sample with a gas chromatograph equipped with a headspace sampler.

According to one embodiment of the present invention, the internal standard is tetrahydrofuran (THF), and the solvent is dimethylformamide (DMF).

According to one embodiment of the present invention, the concentration of THF in the internal standard solution is from 1 mg/mL to 500 mg/mL.

According to one embodiment of the present invention, an amount of the internal standard solution introduced into the standard sample and the test sample is from 0.1 µL/mL to 0.5 µL/mL, respectively, based on an amount of each of the standard sample and the test sample to be measured.

According to one embodiment of the present invention, the headspace sampler comprises a vessel for introducing each of the standard sample and the test sample and temperature of the vessel is from 140 to 160° C.

According to one embodiment of the present invention, the gas chromatograph uses a thermal conductivity detector (TCD) as a detector.

Effect of the Invention

According to the method for measuring a moisture content of the present invention, a moisture content in a separator of a secondary battery can be accurately measured. Particularly, in the case that the separator contains inorganic substances, the inorganic substances may contain moisture in the form of a hydrate. The measurement method has an advantage that moisture present in the form of a hydrate can be also measured.

According to the method for measuring a moisture content of the present invention, it is possible to accurately identify the internal state of the battery by accurately measuring the moisture content in the separator of the secondary battery, thereby improving the life of the battery.

BRIEF DESCRIPTION OF THE DRAWINGS

FIG. 1 is a graph showing a calibration curve prepared according to the moisture content in the standard sample of Example 1.

FIG. 2 is a graph showing a gas chromatograph-thermal conductivity detector (GC-TCD) chromatogram of the test sample according to Example 1 and a GC-TCD chromatogram of the corresponding standard sample.

FIG. 3 is a graph showing a calibration curve prepared according to the moisture content in the standard sample of Example 2.

FIG. 4 is a graph showing a GC-TCD chromatogram of the test sample according to Example 2 and a GC-TCD chromatogram of the corresponding standard sample.

BEST MODE FOR ACCOMPLISHING THE INVENTION

The embodiments provided in accordance with the present invention can be all achieved by the following description. It is to be understood that the following description is of preferred embodiments of the present invention and that the present invention is not necessarily limited thereto.

The present invention provides a method for measuring a moisture content in a separator of a secondary battery by using a gas chromatograph equipped with a headspace sampler.

The method for measuring a moisture content according to the present invention is applied to a separator of a secondary battery. The moisture present in the separator of a secondary battery may generate hydrogen by obtaining electrons from an electrolyte during charging/discharging of the secondary battery, thereby expanding the volume of the battery and reducing the lifetime of the battery. The water which may affect the secondary battery includes water adsorbed to the separator in the form of water molecule as well as water combined with any compound in the form of a hydrate. Therefore, a measurement method that can measure the content of moisture in the form of a hydrate contained in the separator of a secondary battery is also required.

The method for measuring a moisture content according to the present invention can be suitably applied to a safety reinforced separator (SRS) among secondary battery separators. The SRS is formed by coating an inorganic substance particle and a binder polymer on a polyolefin substrate. The SRS has an organic/inorganic complex porous structure. Herein, the inorganic substance particle exists in part in the form of a hydrate, and therefore can retain moisture by themselves. Since the hydrate bonded to the inorganic substance is released at a high temperature, it is difficult to measure the moisture content in the hydrate by conventional methods. In the case of the SRS, it is important to identify the source of water and the content of water. In the present invention, by using a headspace sampler, it is possible to measure the content of moisture in the form of a hydrate bonded to the inorganic substance. Therefore, the method according to the present invention is usefully utilized to measure a moisture content in the SRS.

In the SRS, an active layer comprising the polyolefin substrate, the inorganic substance particles, and the binder polymer exists in an anchoring manner so that the separator substrate and the active layer can be physically firmly bonded. The polyolefin may be polyethylene, polypropylene or the derivatives thereof, but is not limited thereto. The inorganic substance may be $Al_2O_3$, $BaTiO_3$, $BaSO_4$, $TiO_2$ or a combination thereof, but is not limited thereto. In addition, the binder may be a polymer material such as polyvinylidene fluoride (PVDF) or polyvinylidene fluoride-hexafluoropropylene (PVDF-HFP), but is not limited thereto.

The method for measuring a moisture content in a separator of a secondary battery according to the present invention comprises the steps of: mixing an internal standard with a solvent to prepare an internal standard solution; mixing a solvent with water and then introducing the internal standard solution hereto to prepare a standard sample; mixing a solvent with a sample of a separator of a secondary battery and then introducing the internal standard solution hereto to prepare a test sample; measuring the moisture content in the standard sample and the test sample by using a gas chromatograph equipped with a headspace sampler.

An internal standard solution is prepared by mixing a solvent with an internal standard. The internal standard solution is then introduced to the standard solution and the test solution in a certain amount during the preparation of a standard sample and a test sample, which serves to correct the data values. According to the present invention, the internal standard solution is prepared by mixing tetrahydrofuran (THF) as the internal standard with dimethylformamide (DMF) as the solvent, but the present invention is not limited thereto. When a mixture of THF with DMF is used as an internal standard solution, the solution can be mixed with water to allow appropriately swelling of the separator of a secondary battery. It provides a peak at a proper distance from a peak of the water for the analysis, and thus it may be easy to measure the moisture content in the separator of a secondary battery. According to one embodiment of the present invention, the concentration of THF in the internal standard solution may be from 1 mg/mL to 500 mg/mL, preferably from 10 mg/mL to 50 mg/mL. When the concentration of THF in the internal standard solution is out of the above range, the internal standard solution cannot appropriately conduct the correction of errors.

The solvent is mixed with water as a standard substance and then a certain amount of the internal standard solution is introduced thereto, thereby preparing a standard sample. In the standard sample, a predetermined amount of a standard substance is used to obtain the content in the standard substance and the area of the chromatogram, thereby establishing a calibration curve. The area of water measured in the test sample is substituted into the calibration curve to quantitatively analyze the moisture content in the test sample.

The solvent is mixed with a sample of the separator of a secondary battery as a test substance and then a certain amount of the internal standard solution is introduced thereto, thereby preparing a test sample. The equal amounts of the internal standard solutions are introduced to the standard sample and the test sample. According to one embodiment of the present invention, the internal standard solution may be introduced in an amount of from 0.1 μL/mL to 0.5 μL/mL, preferably from 0.2 μL/mL to 0.3 μL/mL based on the total volume of the test sample to be measured. As described above, the internal standard solution serves to correct data values of the moisture content in the standard sample and the test sample, and it can appropriately perform the calibration within the above range.

The prepared standard sample and the test sample are put into a vessel for a headspace sampler, and the samples in the vessel are measured for a moisture content by using a gas chromatograph equipped with a headspace sampler. According to one embodiment of the present invention, the headspace sampler is used under the condition that the temperature of the vessel is from 140 to 160° C. If the temperature is lower than 140° C., the moisture contained in the inorganic substance in the SRS is not sufficiently measured. If the temperature is higher than 160° C., the constituents of the separator may also be dissolved together. A thermal conductivity detector (TCD) is used as the gas chromatography detector.

Hereinafter, preferred embodiments of the present invention will be described in detail so that those skilled in the art can easily carry out the present invention. The present invention may, however, be embodied in many different forms and should not be construed as limited to the embodiments set forth herein.

EXAMPLES

Example 1

Preparation of Internal Standard Solution 10 g of tetrahydrofuran (THF) was placed in a 50 mL volumetric flask, and dimethylformamide (DMF) was introduced to the marked line of the flask. 5 mL of the solution taken out from the volumetric flask was placed in a new 50 mL volumetric flask, and DMF was introduced to the marked line of the flask to prepare an internal standard solution.

Preparation of Standard Sample 3 g, 6 g, and 9 g of water were introduced into each of a 50 mL volumetric flask, and DMF was introduced to the marked line of each of the flask. 5 mL of each solution was taken out from the volumetric flasks and put in each of a new 50 mL volumetric flask, and DMF was then introduced to the marked line of each of the flask. The each resulting solution was placed in a 20 mL vial for a headspace sampler and the vial was sealed with a septum and a cap by using a clamp. 5 µL of the internal standard solution was introduced to the sealed vial by using a microsyringe to prepare standard samples.

Preparation of Test Sample

For the preparation of a test sample, $Al_2O_3$ together with a polyvinylidene fluoride (PVDF) binder in a slurry state was coated onto polyethylene (PE) resin and the coated resin was dried to prepare a safety reinforced separator (SRS). 1 g of the SRS was placed in a 20 mL vial for a headspace sampler and the vial was charged with DMF. The vial was sealed with a septum and a cap by using a clamp. 5 µL of the internal standard solution was introduced to the sealed vial by using a microsyringe to prepare a test sample.

Measurement of Moisture Content in Test Sample

The standard sample and the test sample were analyzed by using a headspace sampler (7694 Headspace Sampler manufactured by Agilent) and a gas chromatograph/thermal conductivity detector (GC/TCD) (6890 GC System manufactured by Agilent). The headspace sampler and GC/TCD were used under the following conditions. A calibration curve was prepared from the results of the analysis of the standard sample and is shown in FIG. 1. The moisture content in the test sample was measured by using the calibration curve of FIG. 1, and the measured moisture content was verified by the GC-TCD chromatogram of FIG. 2. The moisture content in the test sample according to Example 1 was measured to be 802.3 ppm.

[Conditions of Headspace Sampler]
Vial temperature: 150° C.
Loop temperature: 160° C.
Transfer line temperature: 160° C.
Equilibrium time: 30 min
Pressurizing time: 1 min
Loop fill time: 0.25 min
Injection time: 0.5 min
Vial pressure: 6.5 psi
[Conditions of GC/TCD]
Column: Rtx-5 (30 m×0.53 mm I.D.×1.2 m (Film thickness))
Injector temperature: 250° C.
Oven temperature: 50° C./0 min-30° C./min-200° C./min
Detector temperature: 250° C.
Flow: 4 mL (He)
Split ratio: 1/5
Injection volume: 1 µL
Analysis time: 6 min

Comparative Example 1

1 g of the SRS used in Example 1 was heated to 100° C. and the moisture generated at this time was measured by using Karl-Fischer titration method. The moisture content in the SRS was measured to be 590 ppm. It was found that the moisture content measured by using the Karl-Fischer titration method was about 26.5% less than the moisture content measured by using the method of Example 1.

Example 2

Instead of the SRS used in Example 1, a mixture of $Al_2O_3$ with a small amount of $BaTiO_3$ together with a polyvinylidene fluoride (PVDF) binder in a slurry state was coated onto polyethylene (PE) resin and the coated resin was dried to prepare SRS. Experimental procedures were carried out in the same manner as in Example 1 except for the above. The moisture content in the test sample was measured to be 769.0 ppm.

Comparative Example 2

The SRS used in Example 2 was measured for a moisture content by using the Karl-Fischer titration method used in Comparative Example 1. The moisture content in the SRS was measured to be 575 ppm. It was found that the moisture content measured by using the Karl-Fischer titration method was about 25.2% less than the moisture content measured by using the method of Example 2.

Example 3

As the same constitution as that of Example 1, $Al_2O_3$ together with a polyvinylidene fluoride (PVDF) binder in a slurry state was coated onto polyethylene (PE) resin and the coated resin was dried to prepare SRS. In order to measure the moisture content in the separator according to the change of heating temperature and time of the vial, experimental procedures were carried out in the same manner as in Example 1 except for the heating temperature and time. The moisture content values measured by this method are shown in Table 1 below.

TABLE 1

| Temperature (° C.) | Time (min) | Moisture content (ppm) | RSD (%) |
|---|---|---|---|
| 150 | 10 | 610 | 5.4 |
|  | 30 | 655 | 3.3 |
|  | 60 | 700 | 0.5 |
|  | 150 | 770 | 4.8 |
| 120 | 10 | 395 | 6.7 |
|  | 30 | 396 | 2.8 |
|  | 60 | 331 | 8.1 |

From Table 1 above, it can be seen that when the vial is heated to 150° C. in the headspace sampler, moisture contained in the inorganic substance can be more accurately measured than in case of heating to 120° C.

It is intended that the present invention cover the modifications and variations of this invention and the scope of the invention is defined by the claims appended hereto and their equivalents.

The invention claimed is:

1. A method for measuring a moisture content in a separator of a secondary battery, comprising:
   (a) mixing an internal standard with a solvent to prepare an internal standard solution;
   (b) mixing the solvent with water and then introducing the internal standard solution hereto to prepare a standard sample;
   (c) mixing the solvent with a sample of the separator of the secondary battery and then introducing the internal standard solution hereto to prepare a test sample; and
   (d) measuring a moisture content in the standard sample and a moisture content in the test sample with a gas chromatograph equipped with a headspace sampler,
   wherein the headspace sampler comprises a vessel for injecting each of the standard sample and the test sample and a temperature of the vessel is from 140 to 160° C. during measuring a moisture content in the standard sample and a moisture content in the test sample.

2. The method according to claim 1, wherein the separator is a safety reinforced separator (SRS) comprising:
   a polyolefin substrate; and
   a coating layer comprising an inorganic substance particle and a binder polymer.

3. The method according to claim 2, wherein the polyolefin substrate comprises polyethylene or polypropylene.

4. The method according to claim 2, wherein the inorganic substance particle comprises $Al_2O_3$, $BaTiO_3$, $BaSO_4$, $TiO_2$ or a combination thereof.

5. The method according to claim 2, wherein the binder polymer is a polymeric material comprising polyvinylidene fluoride (PVDF) or polyvinylidene fluoride-hexafluoropropylene (PVDF-HFP).

6. The method according to claim 1, wherein the internal standard is tetrahydrofuran (THF), and the solvent is dimethylformamide (DMF).

7. The method according to claim 6, wherein a concentration of tetrahydrofuran (THF) in the internal standard solution is from 1 mg/mL to 500 mg/mL.

8. The method according to claim 1,
   wherein an amount of the internal standard solution introduced into the standard sample is from is 0.1 μL/mL to 0.5 μL/mL based on an amount of the standard sample to be measured, and
   an amount of the internal standard solution introduced into the test sample is from 0.1 μL/mL to 0.5 μL/mL based on an amount of the test sample to be measured.

9. The method according to claim 1, wherein the gas chromatograph uses a thermal conductivity detector (TCD) as a detector.

* * * * *